I. H. DEXTER.
FLEXIBLE COUPLING.
APPLICATION FILED MAY 27, 1919.
1,363,849.
Patented Dec. 28, 1920.
2 SHEETS—SHEET 1.
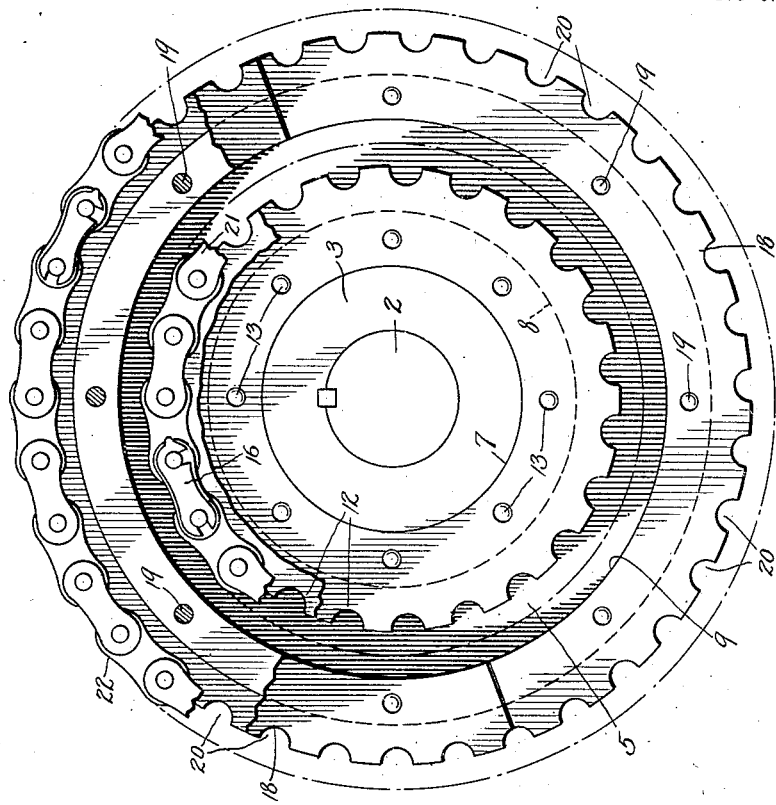
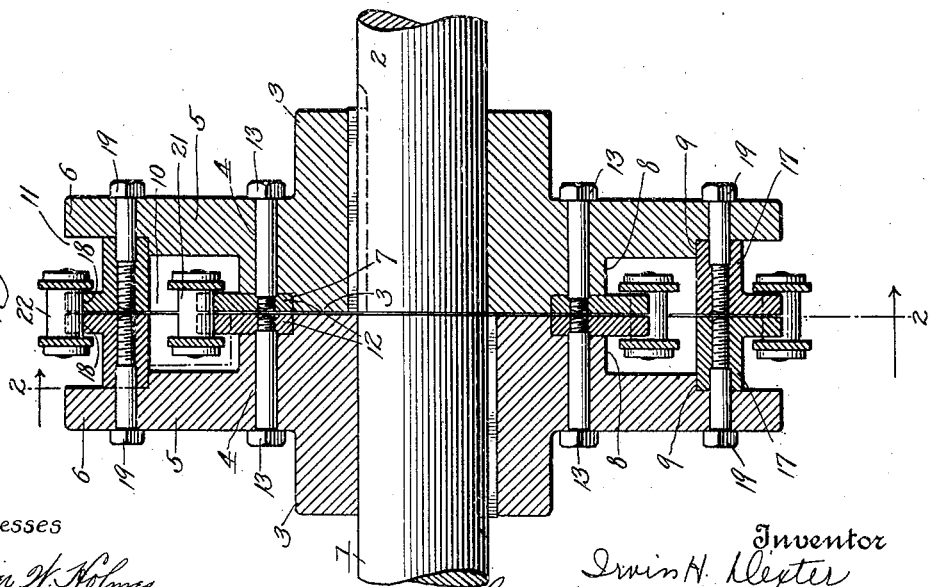
Witnesses
Oliver W. Holmes
Inventor
Irwin H. Dexter
By his Attorneys I. H. DEXTER.
FLEXIBLE COUPLING.
APPLICATION FILED MAY 27, 1919.
1,363,849.
Patented Dec. 28, 1920.
2 SHEETS—SHEET 2.
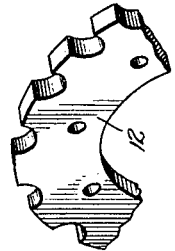
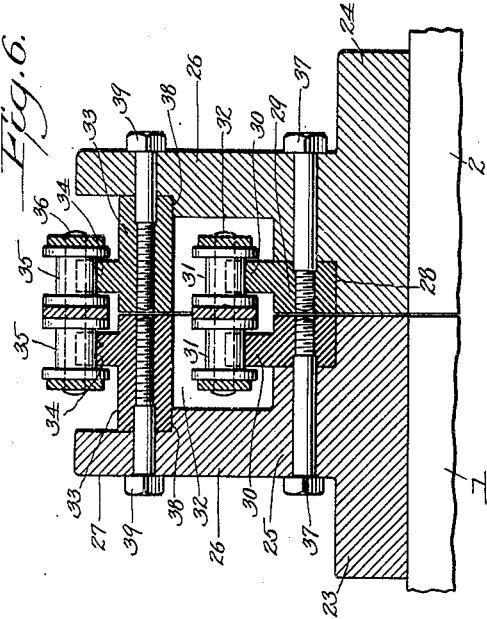
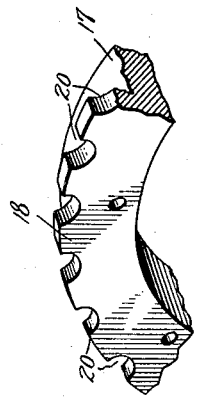
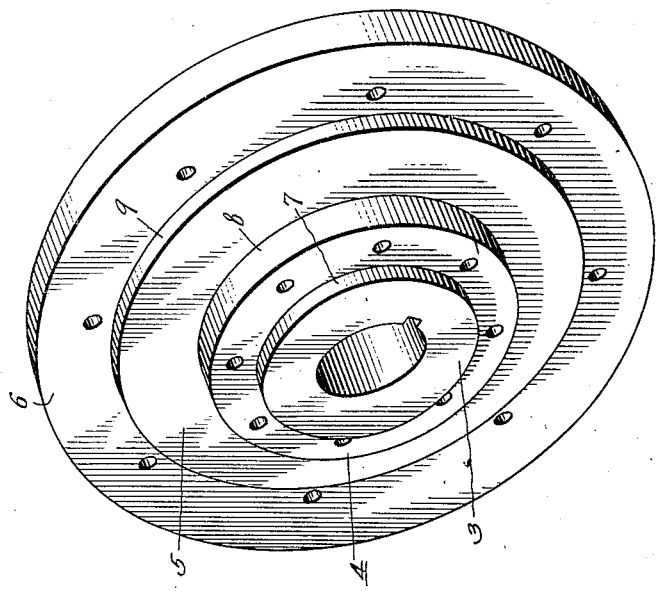
Witnesses
Olive W. Holmes
Inventor
Irvin H. Dexter
By his Attorneys

UNITED STATES PATENT OFFICE.

IRVEN H. DEXTER, OF PEARL RIVER, NEW YORK, ASSIGNOR TO I. H. DEXTER CO., INC., OF NEW YORK, N. Y., A CORPORATION OF NEW YORK.

FLEXIBLE COUPLING.

1,363,849.   Specification of Letters Patent.   Patented Dec. 28, 1920.

Application filed May 27, 1919. Serial No. 300,164.

*To all whom it may concern:*

Be it known that I, IRVEN H. DEXTER, a citizen of the United States, residing at Pearl River, in the county of Rockland and State of New York, have invented certain new and useful Improvements in Flexible Couplings, of which the following is a specification.

This invention relates more especially to that class of flexible couplings which are employed for connecting the adjacently disposed ends of shafts which are approximately coaxially alined. The primary object of my invention is to increase the power transmitting capacity of a clutch of this character by constructional details which occasion little or substantially no strains other than the direct torsional strains of power transmission. Another object of the present invention is to provide improved means for facilitating the assembly or dismantling of a clutch of this character. Other and further objects will appear in the specification and be pointed out in the appended claims, reference being had to the accompanying drawings which exemplify my invention in a preferred embodiment. In the drawings,—

Figure 1 is an axial section of a flexible coupling constructed in accordance with the principles of the present invention, portions of the connected shafts being shown in elevation;

Fig. 2 is a combined section and side elevation on the line 2—2, Fig. 1, parts being broken away;

Fig. 3 is a perspective view of one of the clutch disks detached;

Fig. 4 is a fragmentary perspective view of the outer sprocket ring to be hereinafter referred to;

Fig. 5 is a fragmentary perspective view of the inner sprocket ring;

Fig. 6 is a fragmentary section of a modified construction of the coupling.

In the embodiment of my invention shown in Figs. 1 to 5 inclusive, shaft sections 1 and 2 have keyed thereto coupling disks such as that shown in Fig. 3. Referring more especially to Figs. 1 and 3, each of these coupling disks comprises a hub portion 3, an inner flange portion 4 of relatively great axial extent, an intermediate flange portion 5, and an outer flange portion 6, the axial extent of the flange portion 5 being intermediate between that of the inner flange portion 4 and the outer flange portion 6. By means of this construction, each of said coupling disks 3 is provided with an inner annular recess or shoulder at 7, an intermediate recess at 8, and an outer recess or shoulder at 9. By an inspection of Fig. 1, it will be seen that when the coupling disks are brought together into close juxtaposition, a centrally disposed annular chamber 10 is formed between them which opens into an outer peripheral recess 11 which is wider than the chamber 10. Mounted on the annular shoulder 7 of each coupling disk is a toothed ring or annular sprocket 12 which is secured in position by a plurality of screws 13. After the notches 14 of the sprockets 12 have been brought into register with each other, the sprocket chain 15 is wrapped around the toothed peripheries of the sprockets 12, said sprocket chain being provided with a releasable locking link 16 which permits the sprocket chain to be applied or removed at will. Mounted on the annular shoulders 9 of the coupling disks are the axially elongated hubs 17 of the outer toothed rings or sprockets 18 which are secured in position by means of screws 19, 19. The hub portions 17 of these outer toothed rings or sprockets, constitute in effect a closure for the annular chamber 10. When the notches 20 of the outer toothed rings or sprockets have been brought into register said rings or sprockets are locked against relative angular movement with respect to each other. It will be understood however that the bars or cylinders 21 of the inner chain 15 and the bars or cylinders 22 of the outer chain are of sufficient length to permit the desired degree of angular play between the shaft sections 1 and 2.

Referring now to the embodiment of my invention shown in Fig. 6, means are provided for further increasing the power transmitting capacity of the coupling. Thus, an inspection of Fig. 1 will make it clear that the axial thickness of the annular sprockets is relatively limited by confining each pair of coupled teeth within the axial limits of a single bar or cylinder 21 or 22. In Fig. 6 however, are shown double chains or sprockets for uniting the inner as well as the outer sprockets. Thus in this modification of the invention, the shaft sections 1 and 2 have keyed thereto the hub portions 23 and 24 of the coupling disks which are provided with inner, intermediate, and outer flange portions 25, 26, and 27 respectively of greater, intermediate, and lesser axial extents. Each inner flange portion 25 of each coupling disk is provided with an annular recess or shoulder 28 for accommodating an enlarged annulus 29 of a ring gear or sprocket 30. It will be observed that each of the ring gears or sprockets 30 is of substantially twice the thickness of each of the sprockets 12 as shown in Fig. 1. Thus according to Fig. 6 each brace of bars or cylinders 31, 31, is mounted on a common pin, the double sprocket chain comprising sections wrapped around the paired teeth of the adjacently disposed sprockets 30, 30, and within the chamber 32 formed between the intermediate flange portions 26, 26, and the extended hub portions 33, 33, of the outer sprockets 34, 34 which are respectively of twice the thickness of sprockets 18, 18, shown in Fig. 1. Wrapped about the paired sprockets 34, 34, is a double sprocket chain comprising a plurality of paired bars or cylinders 35, 35 each pair or brace of bars or cylinders being mounted on a common pin 36. Sprockets 30, 30, are secured in position by screws 37 while sprockets 34, 34, are secured in position with respect to recesses or shoulders 38, 38, by means of screws 39, 39.

I claim:

1. A flexible coupling comprising coupling members provided with recesses presented inwardly toward each other, sprockets mounted in said recesses, said sprockets being provided with paired radially projecting teeth, and the teeth of one sprocket being axially spaced from those of the other sprocket to form a peripheral groove, and a double sprocket chain extending around the peripheries of said sprockets, said double sprocket chain comprising two outside series of links adjacent the outer walls of said sprocket teeth, a centrally disposed series of links arranged in the peripheral groove between the teeth of said sprockets, and cross pins common to all of said series of links, said pins constituting power transmitting elements between said sprockets and permitting a limited angular adjustment of the axes of said coupling members.

2. The combination with driving and driven members, of a plurality of toothed members mounted on each of said driving and driven members, each toothed member on one of the first mentioned members being paired with a toothed member on the other of the first mentioned members, and means for locking each pair of toothed members against relative rotary displacement but permitting angular adjustment of said toothed members, said pairs of toothed members being substantially concentrically arranged with respect to each other.

3. The combination with driving and driven members, of a plurality of toothed members mounted on each of said driving and driven members, each toothed member on one of the first mentioned members being paired with a toothed member on the other of the first mentioned members, and means for locking each pair of toothed members against relative rotary displacement but permitting angular adjustment of said toothed members, said pairs of toothed members and locking means therefor being concentrically disposed with respect to a plane transverse to said axes of said driving and driven members.

4. In a flexible coupling, members to be coupled, a plurality of concentrically arranged toothed disks or sprockets connected to each of said members, each of said toothed disks or sprockets being paired with a toothed disk or sprocket on the other member, and a sprocket chain wrapped about each pair of toothed disks or sprockets.

5. In a flexible coupling, driving and driven shafts, coupling members mounted on said shafts and having faces presented toward each other provided with recesses or shoulders, toothed members mounted on said shoulders within the outer peripheral edges of said coupling members, and means extending around said toothed members for transmitting power from said driving member to said driven member, said power transmitting means being housed between said coupling members and permitting a limited angular adjustment between the axes of said shafts.

6. A flexible coupling comprising adjacently disposed driving and driven members provided with inner recesses presented toward each other and outer recesses presented toward each other, a sprocket mounted in each of said inner recesses, a sprocket chain connecting said sprockets, a sprocket mounted in each of said outer recesses, and a sprocket chain connecting said sprockets in the outer recesses.

7. A flexible coupling comprising adjacently disposed driving and driven members provided with inner recesses presented toward each other and outer recesses presented toward each other, a sprocket mounted in each of said inner recesses, a sprocket chain connecting said sprockets, a sprocket mounted in each of said outer recesses, and a sprocket chain connecting said sprockets in the outer recesses, said outer sprockets forming with said members a closed chamber for the inner sprockets and chain.

8. A flexible coupling comprising driving and driven members provided with adjacently disposed inner sprockets and adjacently disposed outer sprockets, a sprocket chain connecting the inner sprockets, and a sprocket chain connecting the outer sprockets.

9. A flexible coupling comprising coupling members adapted to be secured to the adjacent ends of driving and driven shafts, said coupling members being provided with flanges presented toward each other, inner sprocket rings secured to said flanges respectively, a sprocket chain connecting said inner sprocket rings, outer sprocket rings secured to said flanges respectively, and a sprocket chain connecting said outer sprocket rings.

10. A flexible coupling comprising driving and driven members, a pair of inner sprockets secured respectively to said members, a double sprocket chain comprising sections respectively engaging said inner sprockets, a pair of outer sprockets, and a double sprocket chain comprising sections respectively engaging said outer sprockets.

IRVEN H. DEXTER.